United States Patent [19]
Leavitt et al.

[11] Patent Number: 5,530,574
[45] Date of Patent: Jun. 25, 1996

[54] OPTICAL DISPLAY SYSTEM AND LIQUID CRYSTAL CELL HAVING ELECTRODE DETAILS FOR EFFICIENT MANUFACTURING

[75] Inventors: Lyle R. Leavitt, Beaverton; Marshall J. Pinder, Portland, both of Oreg.

[73] Assignee: Tektronix, Inc., Wilsonville, Oreg.

[21] Appl. No.: 213,650

[22] Filed: Mar. 15, 1994

[51] Int. Cl.$^6$ .......................... G02F 1/1343; G02F 1/1345
[52] U.S. Cl. .............................................. 359/087; 359/088
[58] Field of Search ................................. 359/56, 73, 87, 359/88, 54

[56] References Cited

U.S. PATENT DOCUMENTS

| | | | |
|---|---|---|---|
| 3,960,439 | 1/1976 | Becker | 359/54 |
| 4,016,094 | 4/1977 | Tsukamoto | 359/54 |
| 4,449,125 | 5/1984 | Clerc | 359/54 |
| 4,541,691 | 9/1985 | Buzak | 350/335 |
| 4,566,758 | 1/1986 | Bos | 350/346 |
| 4,582,396 | 4/1986 | Bos et al. | 350/347 |
| 4,583,825 | 4/1986 | Buzak | 350/335 |
| 4,635,051 | 1/1987 | Bos | 340/757 |
| 4,652,087 | 3/1987 | Bos et al. | 350/332 |
| 4,674,841 | 6/1987 | Buzak | 350/337 |
| 4,719,507 | 1/1988 | Bos | 358/92 |
| 5,182,665 | 1/1993 | O'Callaghan | 359/73 |
| 5,187,603 | 2/1993 | Bos | 359/73 |

FOREIGN PATENT DOCUMENTS 5387250  8/1978  Japan ........................ 359/87

*Primary Examiner*—Anita Pellman Gross
*Assistant Examiner*—Tiep H. Nguyen
*Attorney, Agent, or Firm*—James W. Jandacek; Richard B. Preiss; John D. Winkelman

[57] ABSTRACT

A liquid crystal cell (60) for an optical display system has a first transparent electrode structure (62) including plural separate display electrodes (72A–72E) spaced apart from and generally parallel to a second electrode structure (64) including a common electrode (106) opposing the display electrodes across a thin layer (76) of liquid crystal material captured between the two electrode structures. Each display electrode has left (92A–92E) and right (94A–94E) ends having respective electrical contact areas (96A–96E, 98A–98E). The left and right ends of each display electrode are electrically driven with a drive signal ($V_{DRIVE}$(A–E)). The common electrode has top (116) and bottom (118) ends located adjacent respective top (108) and bottom (110) side margins of the second electrode structure and having top center (120) and bottom center (122) locations with respective top and bottom electrical contact areas (124, 126). Layers (132, 134) of conductive silver paint connect a different one of the top and bottom contact areas with substantially all of the respective top and bottom ends. The top and bottom contact areas are driven with a time-varying common signal ($V_{COMMON}$); the phase difference ($\phi$(A–E)) between the drive signal and the common signal determines the optical retardation state of the cell segment (140A–140E) corresponding to a respective one of the display electrodes.

2 Claims, 5 Drawing Sheets

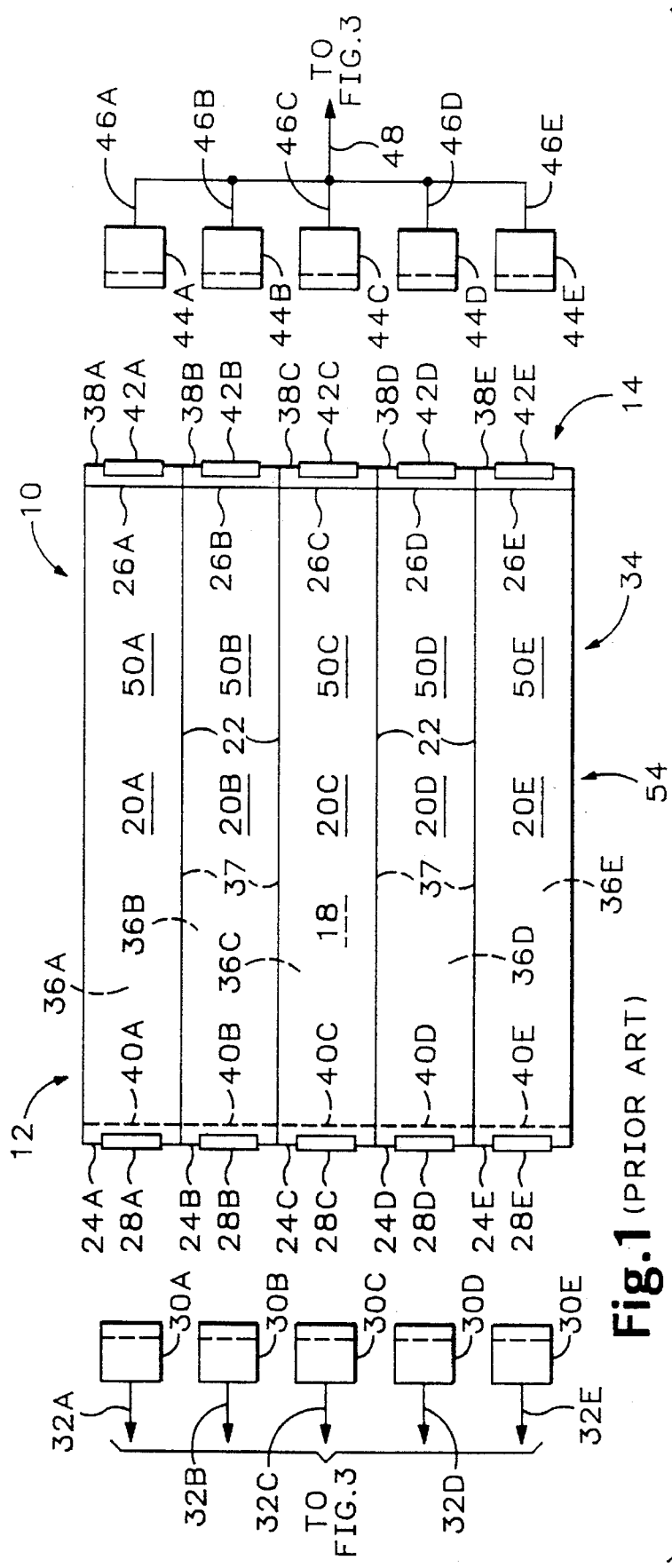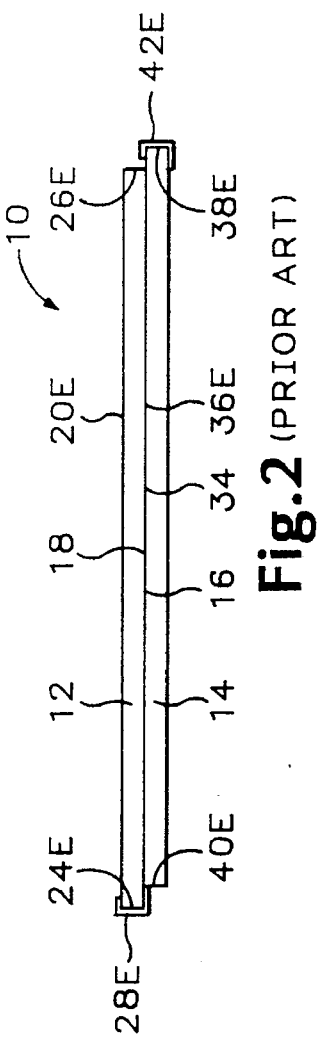
Fig.1 (PRIOR ART)
Fig.2 (PRIOR ART)

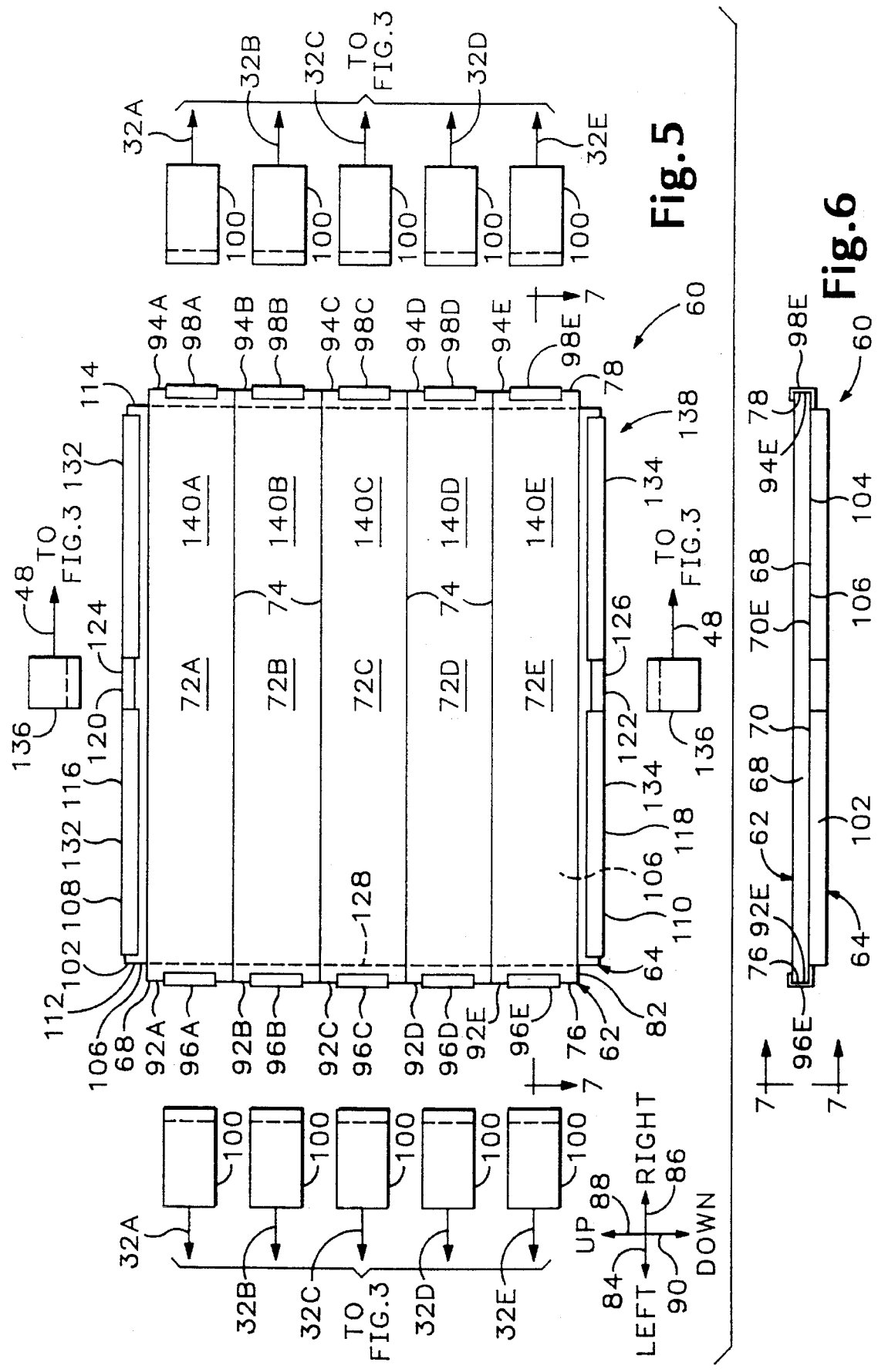

1

OPTICAL DISPLAY SYSTEM AND LIQUID CRYSTAL CELL HAVING ELECTRODE DETAILS FOR EFFICIENT MANUFACTURING

TECHNICAL FIELD

The present invention pertains to optical display systems and liquid crystal cells for such systems.

BACKGROUND OF THE INVENTION

U.S. Pat. Nos. 4,582,396 to Bos et al., 4,541,691 to Buzak, 4,583,825 to Buzak, 4,635,051 to Bos ("'051 Patent"), 4,674,841 to Buzak, and 4,719,507 to Bos ("'507 Patent") disclose a zero to substantially half-wave variable optical retarder that is a liquid crystal cell of a type described therein; they also disclose optical display systems using one or more of such retarders.

FIG. 1 is a plan view, and FIG. 2 is an elevational side view, of a first prior art liquid crystal cell 10 of that type, two of which are used as the two variable optical retarders in a system such as that described in the '051 Patent to produce a perceived image in a full range of colors from a raster display generated by a cathode-ray tube having a phosphor that emits light of many wavelengths including those of three primary colors. With reference to FIGS. 1 and 2, cell 10 has a transparent frontplane substrate 12 and a transparent backplane substrate 14 spaced apart from and generally parallel to each other. A thin layer 16 of nematic liquid crystal material is captured between substrates 12 and 14.

Frontplane substrate 12 has formed on its inner surface 18 plural split, nonintersecting, adjacent frontplane electrodes 20A–20E formed of an electrically conductive and optically transmissive material such as indium tin oxide. Adjacent pairs of frontplane electrodes 20A–20E are separated along their lengths and in part defined by split lines 22. Each of frontplane electrodes 20A–20E has a connection end 24A–24E and a distal end 26A–26E. Each frontplane electrode connection end 24A–24E has an electrode connection area 28A–28E; a different one of connectors 30A–30E is attached to a respective one of connection areas 28A–28E to provide independent electrical connection from each one of frontplane electrodes 20A–20E to a corresponding one of plural drive signal lines 32A–32E, which lead to a switching control unit, and receive signals, described in connection with FIGS. 3 and 4.

Backplane substrate 14 has formed on its inner surface 34 plural split, nonintersecting, adjacent backplane electrodes 36A–36E also formed of an electrically conductive and optically transmissive material such as indium tin oxide. Adjacent pairs of backplane electrodes 36A–36E are separated along their lengths and in part defined by split lines 37. Each of backplane electrodes 36A–36E has one of connection ends 38A–38E and distal ends 40A–40E. Each backplane electrode connection end 38A–38E has one of electrode connection areas 42A–42E; a different one of connectors 44A–44E is attached to a respective one of connection areas 42A–42E to provide independent electrical connection from each of backplane electrodes 36A–36E to a corresponding one of plural common signal lines 46A–46E, which are tied together and lead over line 48 to the switching control unit, and receive a signal, described in connection with FIGS. 3 and 4.

Frontplane electrode connection ends 24A–24E and backplane electrode distal ends 40A–40E are offset relative to each other, as are frontplane electrode distal ends 26A–26E and backplane electrode connection ends 38A–38E, to provide space for convenient attachment of connectors 30A–30E and 44A–44E. Each of frontplane electrodes 20A–20E overlaps with a corresponding one of backplane electrodes 36A–36E to define a respective one of plural cell segments 50A–50E. Each of cell segments 50A–50E is independently electrically driven over line 48 and a respective one of lines 32A–32E to impart to light propagating through the volume of liquid crystal material 16 in that cell segment a desired degree of optical retardation as described in the '051 Patent.

A region of overlap between frontplane electrodes 20A–20E and backplane electrodes 36A–36E defines a display area 54. Frontplane and backplane substrates 12 and 14 are assembled and held in place by suitable structures (not shown) so that each of frontplane electrodes 20A–20E opposes a corresponding one of backplane electrodes 36A–36E across liquid crystal layer 16 and so that each frontplane split line 22 is aligned exactly with a corresponding backplane split line 37 when cell 10 is viewed from and substantially perpendicular to its front. Split lines 22 and 37 are made as narrow as possible to avoid creating gaps in the display formed by cell 10. Frontplane and backplane electrode connection ends 24A–24E and 38A–38E are opposed across respective cell segments 50A–50E and across display area 54.

FIG. 3 shows a switching control unit 56 to which lines 32A–32E and 48 are connected. Control unit 56 produces in the proper sequence on respective ones of lines 32A–32E and 48 drive signals $V_{DRIVE}$(A–E) (produced by a first driver 56') and common signal $V_{COMMON}$ (produced by a second driver 56"), each having a respective electrical potential that varies with time. Control unit 56 is connected to other components (not shown) of an optical display system such as described in the patents identified above and produces signals $V_{DRIVE}$(A–E) and $V_{COMMON}$ in proper synchronization with those other components to produce an optical display system of the desired type.

FIG. 4 shows a signal $V_{DRIVE}$ that is applied to frontplane electrodes 20A–20E and a signal $V_{COMMON}$ that is continuously applied to all of backplane electrodes 36A–36E during display operation. Whenever $V_{DRIVE}$ and $V_{COMMON}$ are phase-displaced by 180°, the rms potential difference across a cell segment is nonzero and thereby places it in a field-aligned or "ON" state to impart essentially no optical retardation to light passing therethrough. Whenever $V_{DRIVE}$ and $V_{COMMON}$ are in phase, the potential difference across a cell segment is zero and thereby places it in a partly relaxed or "OFF" state to impart an amount of optical retardation to light passing therethrough. Switching control unit 56 (FIG. 3) sets the phase-displacement $\phi$ between $V_{DRIVE}$ and $V_{COMMON}$ at 180° and then at 0° in sequence to successive ones of frontplane electrodes 20A–20E at times appropriate to produce the desired full color display in accordance with the '051 Patent.

Cell 10 of FIGS. 1 and 2 has practical disadvantages. First, alignment of split lines 22 and 37 is critical when cell 10 is assembled; if they are not aligned, the viewing quality of an image seen through display area 54 is degraded. Second, forming split lines 22 and 37 takes time, and errors in that step decrease manufacturing yield.

However, it has been the prevailing view that in cell 10 split lines 37 should separate adjacent pairs of backplane electrodes 36A–36E, even though all the backplane electrodes are driven with the same signal $V_{COMMON}$. Such split lines prevent electrical current from crossing among backplane electrodes 36A–36E from a cell segment that is an "ON" segment to other cell segments, particularly to cell segments that are "OFF" segments or are making a transition from the "ON" state to the "OFF" state. Such crossing electrical currents create unwanted differences in electrical potential across liquid crystal layer 16 and thereby impair the formation of the desired image, at least as to some of the pixels of that image derived from pixels of the underlying rastered display.

If backplane substrate 14 were provided not with backplane electrodes 36 separated with split lines 37 but instead with a continuous, conductive region (not shown) on surface 34, voltages induced in that continuous conductive region resulting from currents in it, caused by the electrical potential $V_{DRIVE}$(A–E) applied to frontplane electrodes 20A–20E, would cause sufficiently large changes in electrical potentials across liquid crystal layer 16 to degrade performance of cell 10 to an unacceptable level. As an example, when a continuous backplane electrode is substituted for backplane electrodes 36A–36E in cell 10 (FIGS. 1 and 2), and that modified cell 10 is driven with differential drive waveforms, pixels in the corners of the displayed image may not display the proper images.

A second prior art liquid crystal cell (not shown) of the type described in the patents identified above was used in a system such as that described in the '507 patent to produce a perceived image producing a stereoscopic effect from a raster display generated by a cathode-ray tube. The second prior art cell was similar to cell 10 but had only two frontplane electrodes separated by one frontplane split line and only two backplane electrodes separated by one backplane split line. The left end and right end of each frontplane electrode had electrical contacts connecting those ends to a drive signal such as $V_{DRIVE}$ (FIG. 4) for that frontplane electrode. The backplane electrodes each had a single electrical contact located in respective top center and bottom center locations, and those two electrical contacts were electrically tied together and connected to a signal such as $V_{COMMON}$ (FIG. 4). This second prior art cell has the yield disadvantages discussed in connection with cell 10.

U.S. Pat. No. 4,652,087 to Bos et al. ("'087 Patent") discloses a method and apparatus for reducing optical cross talk in a liquid crystal optical switch. The system disclosed in the '087 Patent has a frontplane substrate supporting two electrodes divided by a split line and a backplane substrate supporting a backplane electrode that is common to all the electrodes on the frontplane substrate, i.e., a backplane electrode having a continuous, conductive region without a split line. However, that system requires more complex and expensive electronic circuitry than that needed to produce the waveforms of FIG. 4 that were used with cell 10.

There is thus a need for a liquid crystal cell of the type described in the patents identified above that can be manufactured more efficiently than cell 10 or the second prior art cell and that can be driven with the waveforms of FIG. 4.

SUMMARY OF THE INVENTION

An object of the invention is, therefore, to provide a liquid crystal display cell that can be manufactured without the critical alignment steps necessary with cell 10 and at lower cost.

Another object of the invention is to provide a liquid crystal display cell meeting the preceding object that performs well when driven with differential drive waveforms such as those shown in FIG. 4.

The present invention is an optical display system that includes a liquid crystal cell of a type described in the patents identified above. The liquid crystal cell has plural separate cell segments defined by plural separate display electrodes formed on a first transparent substrate and a common electrode formed on an opposing, second transparent substrate. The cell segments are typically longer in the direction between the left and right side margins of the display than they are wide in the direction between the top and bottom of the display. First and second drivers provide a differential electrical drive for the cell segments. The first driver drives a selected one of the first electrodes with a drive signal of changing electrical potential, and a second driver drives the common electrode with a common signal of changing electrical potential.

Each cell segment includes a display electrode that extends between the left and right side margins of the display, where electrical contact areas are placed. The common electrode extends in the direction between the top and bottom of the display.

A liquid crystal cell according to the invention has lower series resistance per display segment than that of cell 10 of FIGS. 1 and 2. The reduced resistance sufficiently reduces the voltage levels from adjacent display electrodes that appear on the common electrode so that use of a common electrode does not degrade performance of the liquid crystal cell. The liquid crystal cell eliminates the need for critical alignment experienced with cell 10 because the former cell has split electrodes on only one substrate. Moreover, the liquid crystal cell permits increased manufacturing yield because only one of the substrates is subjected to the additional process steps required to create split electrodes.

These and other objects, features, and advantages of the invention will become apparent upon consideration of the following detailed disclosure of the invention, especially when it is taken in conjunction with the accompanying drawings, in which:

BRIEF DESCRIPTION OF THE DRAWINGS

FIG. 1 is a plan view of a prior art liquid crystal cell and associated electrical connectors.

FIG. 2 is an elevational side view of the cell of FIG. 1.

FIG. 5 is a plan view of an improved liquid crystal cell according to the invention and associated electrical connectors.

FIG. 6 is an elevational side view of the cell of FIG. 5.

DETAILED DESCRIPTION OF A PREFERRED EMBODIMENT

Figure 7:
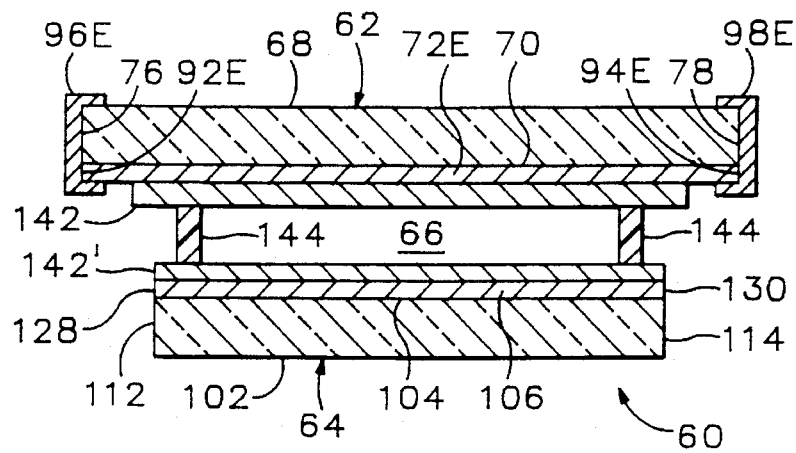
FIG. 7 is a sectional view taken along the lines 7—7 of FIGS. 5 and 6.

FIGS. 5–7 are respective plan, elevational side, and cross sectional views of a liquid crystal cell 60 according to the invention. Cell 60 is used in both cells of a full color display system such as described in connection with cell 10, in which both cells 60 are tuned to provide half-wave retardation to light of the color blue.

With reference to FIGS. 5–7, cell 60 includes a pair of generally parallel, spaced-apart first or upper and second or lower electrode structures 62 and 64 with a layer 66 of nematic liquid crystal captured therebetween. Layer 66 is made as thin as possible, preferably 4 microns, to improve the viewing angle performance of the full color display. Electrode structure 62 includes a transparent glass dielectric first or frontplane substrate 68 which has on its inner surface 70 plural split, nonintersecting, adjacent display or frontplane electrodes 72A–72E, each formed by a layer of indium tin oxide. Adjacent pairs of frontplane electrodes 72A–72E are separated along their lengths and in part defined by split lines 74.

Frontplane substrate 68 has respective left, right, top, and bottom side margins 76, 78, 80, and 82 as determined for convenience of explanation relative to left, right, up, and down directions 84, 86, 88, and 90. Directions 88 and 90 preferably correspond to conventional up and down directions.

Figure 3:
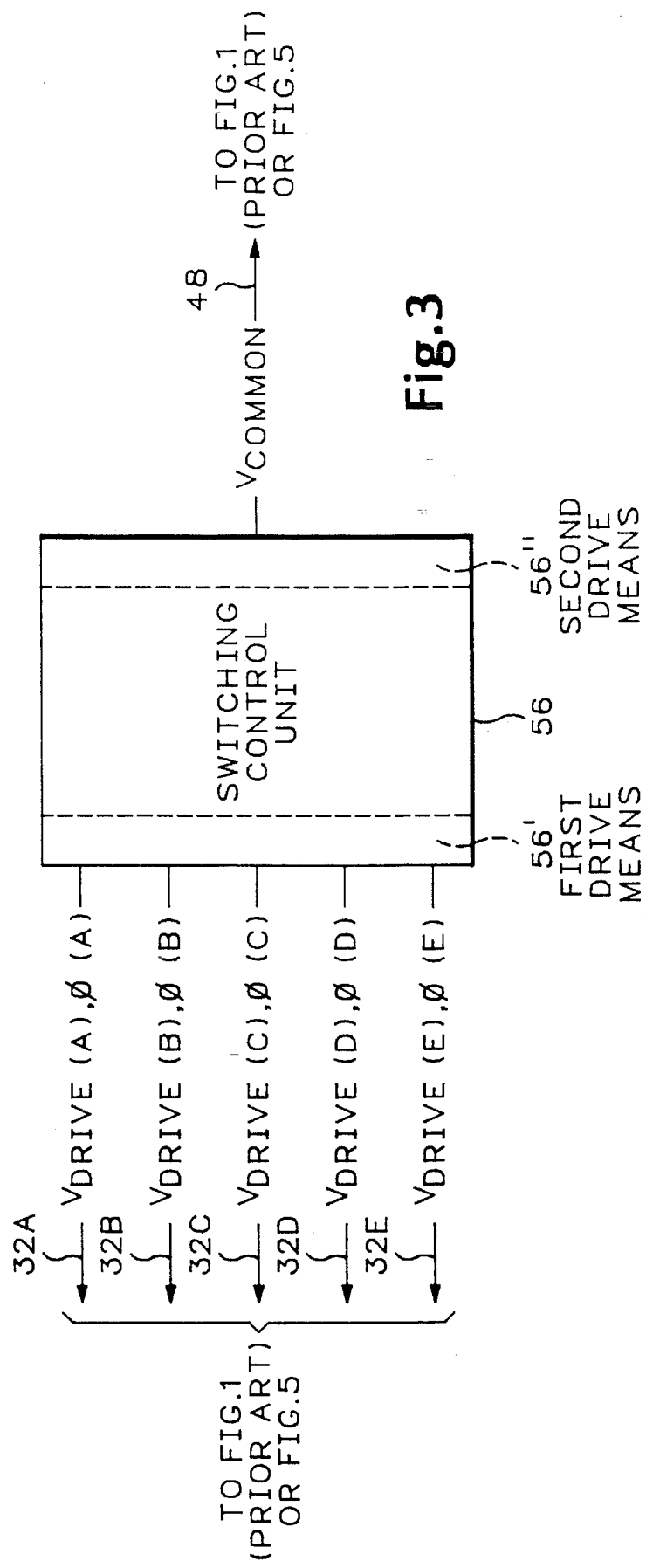
FIG. 3 is a block diagram of a switching control unit used with the cell of FIGS. 1 and 2 or to be used with an improved liquid crystal cell of FIGS. 5–7.
Figure 4:
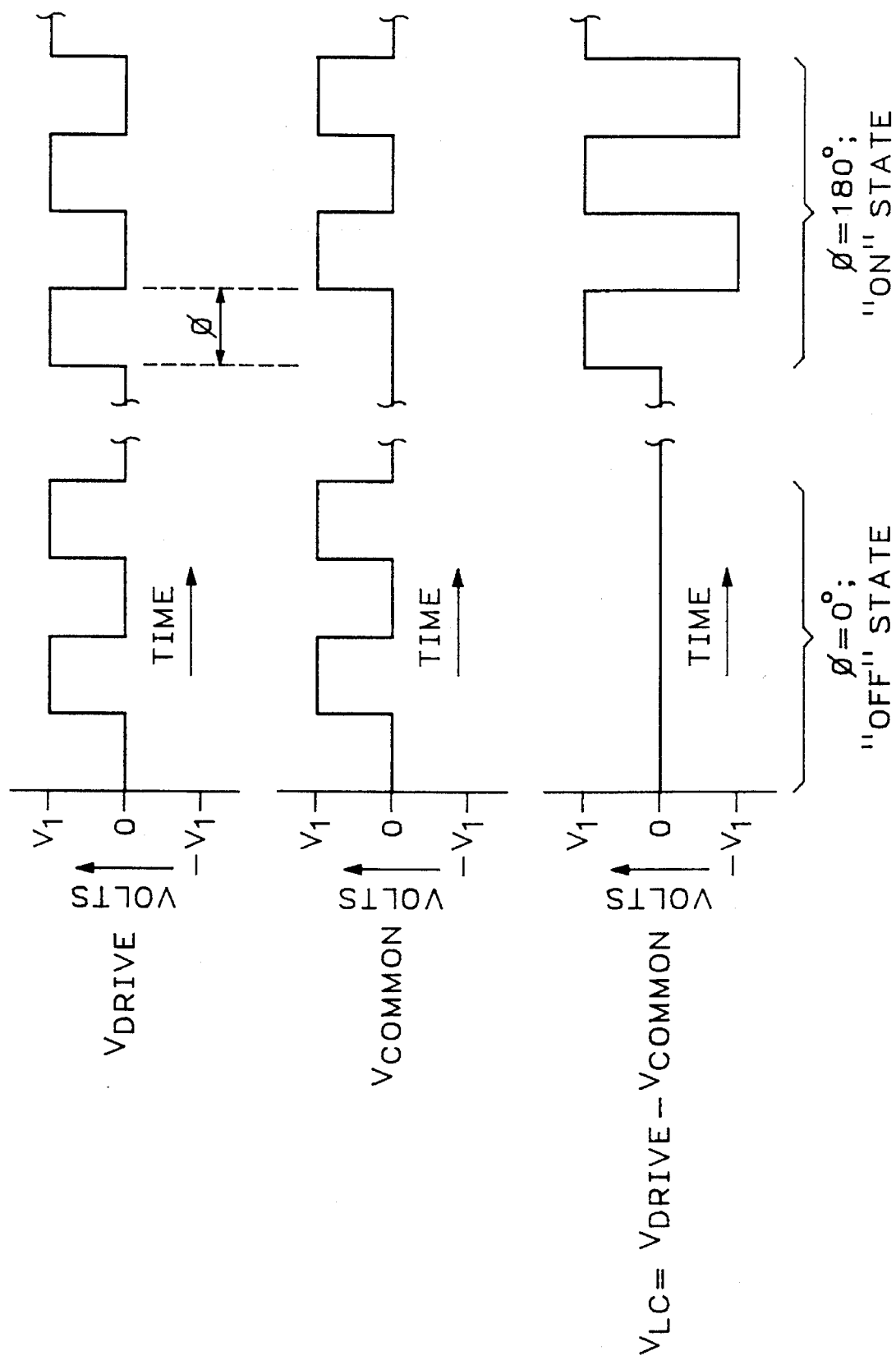
FIG. 4 shows exemplary differential drive waveforms produced by the switching control unit of FIG. 3.

Each of frontplane electrodes 72A–72E has a respective one of first or left frontplane electrode connection ends 92A–92E and opposing second or right connection ends 94A–94E. Each frontplane electrode connection end 92A–92E and 94A–94E has direct electrical connection to a respective one of electrical contacts or contact areas 96A–96E or 98A–98E. Each of contact areas 96A–96E is located adjacent left side margin 76, and each of contact areas 98A–98E is located adjacent right side margin 78. Each of contact areas 96A–96E and 98A–98E is connected through one of electrical connectors 100 to a corresponding one of drive signal lines 32A–32E that lead to switching control unit 58 (FIG. 3) to receive drive signals $V_{DRIVE}(A–E)$ (FIG. 4).

Electrode structure 64 includes a transparent glass dielectric second or backplane substrate 102 which has deposited on its inner surface 104 a backplane or common electrode 106 formed by a layer of the same material used to form display electrodes 72A–72E. Backplane substrate 102 has respective top, bottom, left, and right side margins 108, 110, 112, and 114 as determined for convenience of explanation relative to directions 84, 86, 88, and 90.

Common electrode 106 has opposing top and bottom ends 116 and 118 located adjacent respective top and bottom side margins 108 and 110 and having respective top center and bottom center locations 120 and 122, at which respective electrical contacts or contact areas 124 and 126 are formed medially of left and right side margins 76 and 78 and adjacent a respective one of top and bottom side margins 108 and 110. Common electrode 106 also has opposing left and right ends 128 and 130. Contact areas 124 and 126 are connected to substantially all of respective top and bottom ends 116 and 118 along top and bottom side margins 108 and 110 by respective layers 132 and 134 of conductive silver paint. One of electrical connectors 136 attaches to a respective one of contact areas 124 and 126 and connects that contact area to line 48. Line 48 leads to switching control unit 56 (FIG. 3) to receive common signal $V_{COMMON}$ (FIG. 4).

The region of overlap between all of display electrodes 72A–72E and common electrode 106 defines a display region 138. The region of overlap between one of display electrodes 72A–72E and common electrode 106 defines a respective one of plural cell segments 140A–140E. The frontplane electrode structure 72A–72E of each of respective cell segments 140A–140E is independently electrically driven over a respective one of lines 32A–32E to impart to light propagating through the layer of liquid crystal material 76 in that cell segment a desired degree of optical retardation as described below. $V_{DRIVE}$ (FIG. 4) is applied with phase-displacement $\phi$ at 180° and then at 0° in sequence to successive ones of display electrodes 72A–72E, and $V_{COMMON}$ (FIG. 4) is applied to common electrode 106, as described in connection with FIG. 4.

The effective series resistance of each cell segment 140A–140E of cell 60 is reduced in comparison with that of cell segments 50A–50E of cell 10 (FIG. 1) by the provision of electrical contacts 96A–96E and 98A–98E at opposite left and right ends of respective display electrodes 72A–72E, the elimination of split lines 37 of cell 10 (FIG. 1), and the provision of electrical contacts 124 and 126 at respective top center and bottom center locations 120 and 122. Contributing to that reduction are each of the provision of contacts at opposite ends of display electrodes 72A–72E and common electrode 106, and the placement of the contacts for common electrode 106 on lines perpendicular to the lines on which the contacts for display electrodes 72A–72E are placed. The reduction in resistance lowers the crosstalk produced through common electrode 106 in (as an example) cell segments 140A–140B and 140D–140E when cell segment 140C is in the "ON" state (FIGS. 4, 8A) because the electrical currents in common electrode 106 caused by such a state and flowing beneath one or more of display electrodes 72A–72B and 72D–72E encounter lower resistance and thus develop less deviation from the desired electrical potential $V_{COMMON}$ beneath those other electrodes.

Moreover, common electrode 106 has a characteristic common electrode impedance (e.g., about 100 ohms per square). Each of conductive paint layers 132 and 134 has a characteristic impedance that is substantially less than the characteristic common electrode impedance. Conductive paint layers 132 and 134 thus provide respective electrically conductive pathways between top end 108 and electrical contact area 124 and bottom end 110 and electrical contact area 126 that are in parallel to alternate pathways running solely within common electrode 106 and that have substantially lower impedance than those alternate pathways. Conductive paint layers 132 and 134 thus draw electrical current away from such alternate pathways, thereby reducing voltages that would otherwise develop on common electrode 106 along those alternate pathways and degrade the image produced by cell 60.

With reference to FIG. 7, display electrodes 72A–72E and common electrode 106 are covered by respective director alignment film layers 142 and 142'. The following discussion with reference to layer 142 applies with readily apparent changes to layer 142'.

Layer 142 is applied to conductive layers 72A–72E and forms a boundary between electrode structure 62 and liquid crystal material 76. Spacers 144 may be comprised of any suitable material such as glass fiber to preserve the general parallel relation between electrode structures 62 and 64. The surface of film 142 which contacts the liquid crystal material is conditioned in accordance with a rubbing method to promote a preferred orientation of the directors of the liquid crystal material in contact therewith. The materials constituting and the method of conditioning the director alignment film layer 142 are described in detail below; the same materials and methods are used for layer 142'.

Film layer 142 of electrode structure 62 is conditioned so that the electrode structure surface contacting directors 146 are aligned parallel to each other at a tilt bias angle +θ, which is measured in the counterclockwise sense with reference to the surface of film layer 142. The film layer 142' of electrode structure 64 is conditioned so that the electrode structure surface contacting directors 148 are aligned parallel to each other at a tilt bias angle −θ which is measured in the clockwise sense with reference to the surface of film layer 142'. Thus, liquid crystal cell 60 is fabricated so that the surface contacting directors 146 and 148 of the opposed surfaces of director alignment layers 142 and 142' of electrode structures 62 and 64, respectively, are tilt-biased in opposite directions.

A preferred method of effecting the desired alignment of the surface contacting directors entails the use of polyimide as the material which comprises the alignment film layers 142 and 142' on electrode structures 62 and 64, respectively. Each alignment film layer is rubbed to produce a tilt bias angle |θ|, with 2° to 5° being the preferred range.

Figure 8A:
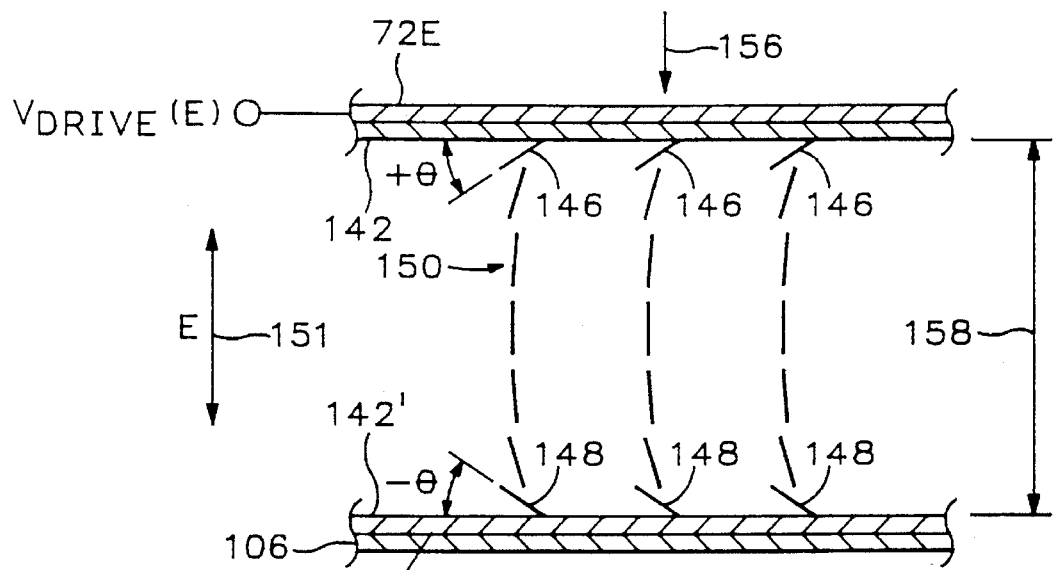
FIGS. 8A and 8B are schematic diagrams of the director alignment configuration of one of the cell segments of the cell of FIGS. 5–7 in, respectively, the field-aligned ("ON") state and the partly relaxed ("OFF") state.

FIG. 8A depicts the orientation of surface noncontacting directors 150 when an AC signal $V_{LC}(E)=V_{DRIVE}(E)-V_{COMMON}$, with the phase-displacement, $\phi(E)$, between $V_{DRIVE}(E)$ and $V_{COMMON}$ equal to 180° (FIG. 4), of approximately 2 kHz and 20 volts rms is applied between conductive layers 72E and 106 of electrode structures 62 and 64, respectively. The phase relationship $\phi(E)=180°$ constitutes a first switching state produced by switching control unit 56 (FIG. 3) and produces an alternating electric field, E, between electrode structures 62 and 64 within the liquid crystal cell 60 to force the cell into its "ON" optical retardation state. A substantial number of the surface noncontacting directors 150 of a liquid crystal material 66 which has a positive anisotropy value align essentially end-to-end along direction 151 of the electric field flux lines within the cell, which direction is normal to the conditioned surfaces of the electrode structures. Thus, when cell 60 is excited into its "ON" state, the surface noncontacting directors 150 are aligned perpendicularly to the surfaces of the cell.

Figure 8B:
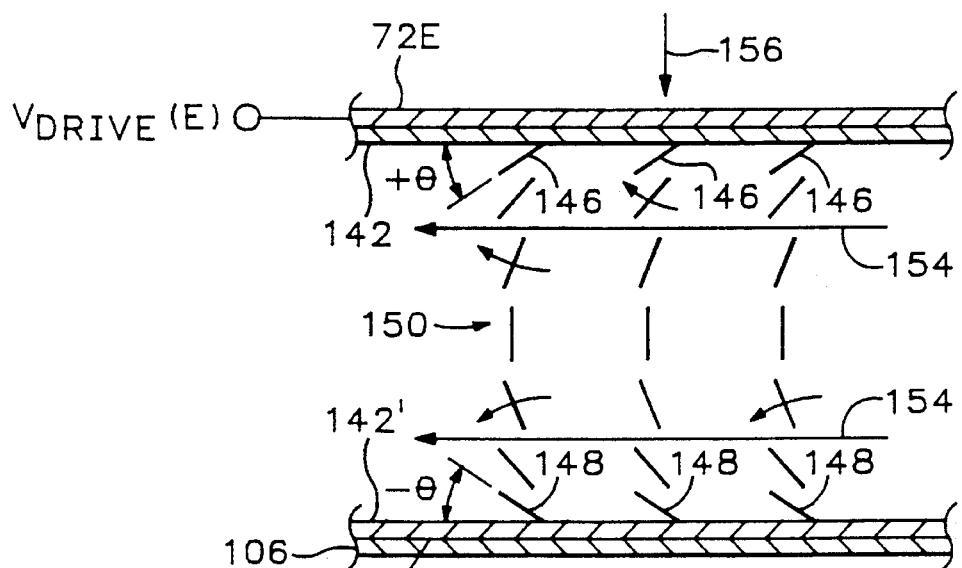

FIG. 8B depicts the orientation of surface noncontacting directors 150 after the signal $V_{LC}(E)$ is placed in the state having the phase relationship $\phi=0°$ (FIG. 4). In that state $V_{LC}(E)=0$, and the alignment of surface noncontacting directors is influenced not by an electric field produced between electrode structures 62 and 64 within the cell, but by the interim molecular elastic forces which cause relaxation of the surface noncontacting directors from the end-to-end alignment of the "ON" state and cause liquid crystal material 66 to flow in direction 154. Thus, the state $\phi=0°$ constitutes a second switching state produced by switching control unit 56 (FIG. 3). The director orientation shown in FIG. 8B corresponds to that of the "OFF" optical retardation state of the cell.

During the transition from the "ON" state to the "OFF" state of the liquid crystal cell, the surface noncontacting directors recede from the end-to-end alignment normal to the electrode structure surfaces and attempt to assume a generally parallel relation with the adjacent directors. When cell 60 relaxes to its "OFF" state, each one of a substantial number of the surface noncontacting directors is aligned so that it projects a director component onto the surfaces of the cell. The surface noncontacting directors, however, lie approximately in a plane which is perpendicular to the surfaces of the cell.

In systems such as described in the patents identified above, cell 60 is operated as a zero to substantially half-wave optical retarder whose optic axis corresponds to the alignment direction of the nonsurface contacting directors 150.

Linearly polarized light which propagates in direction 156 normal to the surfaces of electrode structures 62 and 64 is coincident with the direction of surface noncontacting directors 150 when the liquid crystal cell is in the "ON" state. Directors 150 are oriented in such "ON" state so that there is a negligible projection of the optic axis on the electrode structure surfaces of the cell.

Linearly polarized light which propagates in direction 156 normal to the surfaces of electrode structures 62 and 64 is noncoincident with the alignment direction of surface noncontacting directors when the liquid crystal cell is in the "OFF" state. Directors 150 are oriented in such "OFF" state so that each one of a substantial number of them projects a component on the electrode structure surfaces of the cell. Under these conditions, liquid crystal cell 60 has an effective birefringence for generally normally incident light. The orientation of surface noncontacting directors 150 provides substantially half-wave optical retardation for light of the wavelength, λ, which satisfies the mathematical expression:

$$\frac{\Delta nd}{\lambda} = \frac{1}{2}$$

where d represents the thickness 158 (FIG. 8A) and Δn represents the effective birefringence of the cell.

It will be apparent to skilled persons that many changes may be made to details of the specific embodiments of the invention described herein without departing from the underlying principles thereof. The scope of the invention should, therefore, be determined only by the following claims.

We claim:

1. An optical display system, comprising:

first and second spaced-apart and generally parallel transparent electrode structures;

the first electrode structure having opposing left and right side margins and including plural separate display electrodes;

the second electrode structure having opposing top and bottom side margins and including a common electrode opposed to the display electrodes, the common electrode having a characteristic common impedance and extending between the top and bottom side margins and including opposing top and bottom ends located near different ones of the top and bottom side margins, the second electrode structure further comprising a pair of common region electrical contacts, each different one of the electrical contacts electrically connected to a different one of the top and bottom ends and located adjacent a different one of the top and bottom side margins medially of the left and right side margins, the second electrode structure further comprising first and second electrical connections between each respective one of the common region electrical contacts and substantially all of a respective one of the top and bottom ends, the electrical connections having a characteristic impedance substantially less than the characteristic common impedance;

the first and second electrode structures each having an inner surface that includes a director alignment layer which has a conditioned surface so that directors of a liquid crystal material in contact therewith become substantially uniformly aligned to form tilt bias angles with the conditioned surfaces, the tilt bias angles of the directors in contact with one conditioned surface being defined in a rotational sense opposite to that of the tilt bias angles of the directors in contact with the other conditioned surface;

a liquid crystal material captured between the electrode structures, regions where the display electrodes overlap the common electrode defining plural separate cell segments;

first means for electrically driving a selected display electrode with a drive signal having a varying drive signal electrical potential; and second means for electrically driving the common electrode with a common signal having a varying common signal electrical potential, the drive and common signals cooperating to cause the liquid crystal material in the one of the cell segments defined in part by the selected display electrode to assume selectively different ones of plural optical retardation conditions, each corresponding to one of plural different relationships between the drive signal electrical potential and the common signal electrical potential.

2. A liquid crystal cell for an optical display system, comprising:

a first transparent substrate having opposing left and right side margins;

plural separate display electrodes, each supported by the first substrate, each extending between the left and right side margins, and each having a left end and a right end, each left end adjacent the left side margin and each right end adjacent the right side margin;

a second transparent substrate spaced apart from and generally parallel to the first transparent substrate and having opposing top and bottom side margins;

a common electrode supported by the second substrate, having opposing top and bottom ends adjacent respective ones of the top and bottom side margins, and opposed to the display electrodes, the common electrode having a characteristic common electrode impedance and a pair of common region electrical contacts, each different one of the pair electrically connected to a different one of the top and bottom ends and located adjacent to a different one of the top and bottom side margins medially of the left and right side margins, the common electrode further comprising first and second electrical connections between each respective one of the common region electrical contacts and substantially all of a respective one of the top and bottom ends, the electrical connections having a characteristic impedance substantially less than the characteristic common electrode impedance;

a layer of liquid crystal material captured between the first and second substrates, the liquid crystal material contained in plural different regions of overlap between one of the display electrodes and the common electrode defining different ones of plural display segments; and plural pairs of first electrical contacts, different ones of each pair of the first electrical contacts electrically connected to different ones of the left and right ends of the one of the first display electrodes corresponding to that pair and located adjacent a different one of the left and right side margins.

* * * * *